(12) United States Patent
Kawato et al.

(10) Patent No.: US 8,586,695 B2
(45) Date of Patent: Nov. 19, 2013

(54) POLYMERIZATION CATALYST FOR POLYTHIOURETHANE OPTICAL MATERIAL, POLYMERIZABLE COMPOSITION CONTAINING THE SAME, POLYTHIOURETHANE RESIN OBTAINED FROM THE COMPOSITION, AND PROCESS FOR PRODUCING THE RESIN

(75) Inventors: Nobuo Kawato, Kureme (JP); Masanori Iwazumi, Irvine, CA (US); Hidetoshi Hayashi, Omuta (JP); Seiichi Kobayashi, Omuta (JP)

(73) Assignee: Mitsui Chemicals, Inc., Minato-ku, Tokyo (JP)

( * ) Notice: Subject to any disclaimer, the term of this patent is extended or adjusted under 35 U.S.C. 154(b) by 129 days.

(21) Appl. No.: 12/948,988

(22) Filed: Nov. 18, 2010

(65) Prior Publication Data

US 2011/0065884 A1   Mar. 17, 2011

Related U.S. Application Data

(62) Division of application No. 12/440,243, filed as application No. PCT/JP2007/000990 on Sep. 11, 2007, now abandoned.

(30) Foreign Application Priority Data

Sep. 21, 2006 (JP) ................ 2006-255640

(51) Int. Cl.
  *C08G 18/00* (2006.01)
(52) U.S. Cl.
  USPC .......... 528/52; 528/49; 528/59; 528/65; 528/67; 528/73; 528/76; 528/373; 528/374; 528/375; 351/159; 428/423.1; 359/642
(58) Field of Classification Search
  USPC ........... 528/49, 59, 65, 73, 76, 67, 373, 374, 528/375, 52; 351/159; 428/423.1; 359/642
  See application file for complete search history.

(56) References Cited

U.S. PATENT DOCUMENTS

| 5,091,543 A * | 2/1992 | Grey ........................... 549/228 |
| 5,171,830 A | 12/1992 | Grey |
| 5,693,738 A * | 12/1997 | Okazaki et al. ............... 528/51 |
| 2004/0026658 A1* | 2/2004 | Yoshimura et al. ...... 252/183.11 |
| 2006/0149018 A1 | 7/2006 | Kitahara |
| 2007/0185223 A1* | 8/2007 | Ortalda ....................... 521/172 |

FOREIGN PATENT DOCUMENTS

| CN | 1119195 A | 3/1996 |
| EP | 0 676 429 A2 | 10/1995 |
| EP | 1 316 819 A1 | 6/2003 |
| EP | 1 637 553 A1 | 3/2006 |
| GB | 968400 A | 9/1964 |
| GB | 996767 | * 6/1965 |
| JP | 62-016484 A | 1/1987 |
| JP | 63-077918 A | 4/1988 |
| JP | 3-084021 A | 4/1991 |
| JP | 8-208792 A | 8/1996 |
| JP | 9-077850 A | 3/1997 |
| JP | 10-130355 A | 5/1998 |
| JP | 2000-256571 A | 9/2000 |
| JP | 2001072739 A | * 3/2001 |
| JP | 2002-082203 A | 3/2002 |
| JP | 2002-121379 A | 4/2002 |
| JP | 2002-528613 A | 9/2002 |
| WO | WO 00/26272 A1 | 5/2000 |
| WO | WO 2005080464 A1 | * 9/2005 |

OTHER PUBLICATIONS

Extended Search Report from European Patent Office issued in corresponding European Patent Application No. 07805845.0 dated Oct. 28, 2010.
Office Action from Chinese Patent Office issued in corresponding Chinese Patent Application No. 200780032773.6 dated Feb. 1, 2011.
Lin Fu-Rong, et al., "Study on Addition Reaction of Benzenesulfonyl Chloride and Isoprene", Journal of Zhejiang University (Engineering Science), Sep. 2004, pp. 1227-1230, vol. 38, No. 9, China, with an English abstract.
Form PCT/ISA/210 (International Search Report) dated Dec. 11, 2007.
Office Action from Korean Patent Office issued in corresponding Korean Patent Application No. 10-2009-7007627 dated Feb. 22, 2012.
Office Action issued Mar. 14, 2013 in corresponding European Patent Application No. 07 805 845.0.

* cited by examiner

*Primary Examiner* — Michael L Leonard
(74) *Attorney, Agent, or Firm* — Buchanan Ingersoll & Rooney PC

(57) ABSTRACT

By using an amine hydrochloride represented by the formula (1) as a catalyst, a polythiourethane resin which is suitably used for a transparent resin for optical use, can be obtained without using an organotin compound which has been conventionally used as a catalyst for polythiourethane resins and without being affected by the acidity of an additive:

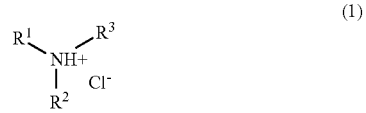

wherein $R^1$, $R^2$ and $R^3$ independently represent a monovalent or higher valent linear aliphatic, branched aliphatic, cyclic aliphatic or aromatic organic residue which may have a hydroxyl group or an amino group; and $R^1$, $R^2$ and $R^3$ may be arbitrarily bonded to each other to form a ring.

5 Claims, No Drawings

POLYMERIZATION CATALYST FOR POLYTHIOURETHANE OPTICAL MATERIAL, POLYMERIZABLE COMPOSITION CONTAINING THE SAME, POLYTHIOURETHANE RESIN OBTAINED FROM THE COMPOSITION, AND PROCESS FOR PRODUCING THE RESIN

The present application is a Divisional Application of U.S. application Ser. No. 12/440,243, filed Mar. 6, 2009, which is the National Stage of International Application No. PCT/JP2007/000990, filed Sep. 11, 2007, and claims foreign priority to Japanese Application No. 2006-255640, filed Sep. 21, 2006, the entire contents of each of which are incorporated by reference herein.

TECHNICAL FIELD

The present invention relates to a polymerization catalyst for polythiourethane, a polymerizable composition for obtaining a polythiourethane resin, an optical material comprising the polythiourethane resin, and a process for producing the polythiourethane resin.

BACKGROUND ART

In recent years, harmony with global environment or reduction of environmental burdens is becoming a major issue in the industry. Therefore, the development of environmentally friendly products or technologies is accelerating. This movement is seen in a technical field of the present invention. In particular, an organotin catalyst, which is widely used as a catalyst for a polythiourethane resin, has been concerned because it is harmful to humans as it is highly toxic, may become the endocrine disruptor, etc. Consequently, regulation on the use of organotin compounds has been strengthened primarily in developed countries. In a spectacle lens industry employing polythiourethane resins, development of an alternative catalyst to the organotin catalyst has been required. As the tin-free non-metallic catalyst which a general thermosetting resin can be obtained, amine compounds, amine carboxylate, phosphine and the like are known (Patent Documents 1, 2, 3, 4 and 5).

[Patent Document 1] Japanese Laid-open patent publication No. H03-084021

[Patent Document 2] Japanese Laid-open patent publication No. S63-077918

[Patent Document 3] Japanese Laid-open patent publication No. S62-016484

[Patent Document 4] Japanese Laid-open patent publication No. H09-077850

[Patent Document 5] Japanese Laid-open patent publication No. 2000-256571

DISCLOSURE OF THE INVENTION

The present inventors have studied using the above-mentioned amine compounds, amine carboxylate and phosphine as the tin-free non-metallic catalyst. As a result, optical inhomogeneity or white turbidity occurred in the obtained resin in some cases, a resin having stable quality as a transparent resin for optical use such as plastic lenses for spectacles could not be always obtained. The present invention provides a polymerization catalyst, which contains no organotin compound which has been conventionally used as a catalyst for polythiourethane resins, which is obtained the resin with stable quality, and which is used for producing a polythiourethane resin which can be suitably used as a transparent resin for optical use can be obtained with stable quality.

Generally a cast polymerization method, in which a polymerizable composition is injected in a mold and cured under heating, is employed for production of the polythiourethane resin as a material for plastic lenses or the like. On the occasion, the polymerization reaction is carried out from several hours to several tens of hours while gradually rising the temperature from low temperature to high temperature. It is important to ensure sufficient time until casting, that is, sufficient pot life (usable time) for the improvement of workability. In addition, it is necessary that the polymerization is completed to bring out full resin properties. In order to be completed the polymerization, examples of the method may include using a catalyst having strong polymerization activity, and increasing the amount of a catalyst. Furthermore, in order to obtain stable polymerization properties, it is important to ensure stable pot life in different lots. If the pot life fluctuates with respect to each lot, there is a possibility of affecting the quality stability of the resin by polymerization lag. Accordingly, the present invention further provides a polymerization catalyst which brings stable pot life.

The present inventors have studies about the reason stable resins cannot be obtained by occurrence of optical inhomogeneity or white turbidity or the like, and as a result, it became clear that polymerization activity of the above-mentioned non-metallic catalyst is affected by the acidity of an additive to be used. Generally, optical inhomogeneity could occur in a lens when the polymerization rate is too fast, and alternatively white turbidity appears in a resin when the polymerization rate becomes slow. A different of the polymerization rate, which occurs by the difference of the acidity of an additive, is expected to be the cause that stable resins cannot be obtained. In particular, as for an acid phosphate-based internal mold release agent to be used when producing a plastic lens material for spectacles, the acidity might differ depending on a producing lot, and the case where stable plastic lenses cannot be obtained is expected. Therefore, they have conducted extensive studies, as a result, have found that amine hydrochloride is a polymerization catalyst which is not affected by the acidity of an additive, and can be obtained a satisfactory polythiourethane resin as a transparent resin for optical use, and the present invention is completed.

That is, the present invention relates to

[1] a polymerization catalyst for a polythiourethane optical material which is amine hydrochloride represented by the general formula (1):

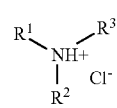

wherein $R^1$, $R^2$ and $R^3$ independently represent an organic residue derived from a linear aliphatic compound, an organic residue derived from a branched aliphatic compound, an organic residue derived from a cyclic aliphatic compound or an organic residue derived from a aromatic compound, which may have a hydroxyl group or an amino group and is a monovalent or higher valent; and $R^1$, $R^2$ and $R^3$ may be arbitrarily bonded to each other to form a ring.

Hereinafter, [2] to [9] are each one of preferred embodiments of the present invention.

[2] The polymerization catalyst as described in [1], in which $R^1$, $R^2$ and $R^3$ of amine hydrochloride represented by the general formula (1) is an alkyl group having 1 to 8 carbon atom(s).

[3] The polymerization catalyst as described in [2], in which amine hydrochloride represented by the general formula (1) is triethylamine hydrochloride, tri-n-butylamine hydrochloride, triisobutylamine hydrochloride, N,N-dimethylcyclohexylamine hydrochloride or N-methyldicyclohexylamine hydrochloride.

[4] A polymerizable composition for a polythiourethane optical material, which contains the polymerization catalyst as described in any one of [1] to [3], one or more kinds of isocyanates selected from a polyisocyanate compound, a polyisothiocyanate compound and a polyisothiocyanate compound having an isocyanato group, and one or more kinds of thiols selected from polythiol compounds.

[5] The polymerizable composition as described in [4], in which the isocyanates is one or more compound(s) selected from the group consisting of m-xylylenediisocyanate, 2,5-bis (isocyanatomethyl)-bicyclo-[2.2.1]-heptane, 2,6-bis(isocyanatomethyl)-bicyclo-[2.2.1]-heptane, 1,3-bis(isocyanatomethyl)cyclohexane, 1,4-bis(isocyanatomethyl)cyclohexane and hexamethylene diisocyanate; and the thiols is one or more compound(s) selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis (mercaptomethylthio)ethane, 4,6-bis(mercaptomethylthio)-1,3-dithiane and 2-(2,2-bis(mercaptodimethylthio)ethyl)-1,3-dithietane.

[6] A polythiourethane resin obtained by curing the polymerizable composition as described in [4] or [5].

[7] An optical material including the polythiourethane resin as described in [6].

[8] A plastic lens including the optical material as described in [7].

[9] A method for producing a polythiourethane resin, which includes:
obtaining a polythiourethane resin by cast-polymerizing the polymerizable composition as described in [4] or [5].

A polymerization catalyst of the present invention does not contain an organotin compound possibly harmful to humans, and exhibits stable polymerization activity which is not affected by the acidity of an additive. That is, according to the present invention, since the polymerization catalyst is hardly affected by additives, quality of monomers, kinds of monomers or the like, a polymerizable composition containing the polymerization catalyst exhibits stable polymerization properties and stable pot life. The polymerization catalyst of the present invention can suppress the rate of occurrence of optical inhomogeneity or white turbidity in the obtained resin. Such a polythiourethane polymerization catalyst is suitable for application to optical materials in which high refractive index and high transparency are required.

BEST MODE FOR CARRYING OUT THE INVENTION

Hereinafter, the present invention will be illustrated in detail.

The present invention relates to a polymerization catalyst for polythiourethane optical material which is an amine hydrochloride represented by the general formula (1):

wherein $R^1$, $R^2$ and $R^3$ independently represent an organic residue derived from a linear aliphatic compound, an organic residue derived from a branched aliphatic compound, an organic residue derived from a cyclic aliphatic compound or an organic residue derived from a aromatic compound, which may have a hydroxyl group or an amino group and is a monovalent or higher valent; and $R^1$, $R^2$ and $R^3$ may be arbitrarily bonded to each other to form a ring Examples of $R^1$, $R^2$ and $R^3$ may include a monovalent or higher valent organic residue derived from a linear aliphatic compound such as methane, ethane, propane, butane, pentane, hexane, heptane, octane, nonane, decane, undecane, dodecane, tetradecane, hexadecane, ethylene, propylene, 1-butene, 2-butene and butadiene;

a monovalent or higher valent organic residue derived from a branched aliphatic compound such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, 4-propyloctane, 2-methyl-1-butene, 3-methyl-1-butene, 2-methyl-2-butene, 2-methyl-butadiene and 2,3-dimethylbutadiene;

a monovalent or higher valent organic residue derived from a cyclic aliphatic compound such as cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane and bis(4-methylcyclohexyl)methane;

a monovalent or higher valent organic residue derived from an aromatic compound such as benzene, toluene, o-xylene, m-xylene, p-xylene, naphthalene, biphenyl, anthracene, perylene, styrene and ethylbenzene;

a monovalent or higher valent organic residue derived from an alcohol compound such as methanol, ethanol, propanol, isopropanol, butanol, isobutanol, pentanol, hexanol, heptanol, octanol, nonanol, decanol, undecanol and dodecanol;

a monovalent or higher valent organic residue derived from a primary amine compound such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine and 1,2-dimethylhexylamine;

a monovalent or higher valent organic residue derived from a secondary amine compound such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine and methylhexylamine;

a monovalent or higher valent organic residue derived from a tertiary amine compound such as triethylamine, tributylamine, trihexylamine, N,N-diisopropylethylamine, triethylenediamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine and N-methyldibenzylamine; and the like. However, they are not limited to only these exemplified compounds. $R^1$, $R^2$ and $R^3$ may be arbitrarily bonded to each other to form a ring. The term "may be arbitrarily bonded to each other to form a ring" here means that optional two or more groups among $R^1$, $R^2$ and $R^3$ are bonded to form a ring.

The above-mentioned $R^1$, $R^2$ and $R^3$ are more preferable to be each an alkyl group having 1 to 8 carbon atom(s).

Specific examples of the amine hydrochloride according to the present invention may include triethylamine hydrochloride, tri-n-propylamine hydrochloride, triisopropylamine hydrochloride, tri-n-butylamine hydrochloride, triisobutylamine hydrochloride, tripentylamine hydrochloride, trihexylamine hydrochloride, trioctylamine hydrochloride, N,N-diisopropylethylamine hydrochloride, triethylenediamine hydrochloride, N,N-dimethylethanolamine hydrochloride, N,N-diethylethanolamine hydrochloride, N,N-dibutylethanolamine hydrochloride, triethanolamine hydrochloride, N-ethyldiethanolamine hydrochloride, N,N-dimethylbenzylamine hydrochloride, N,N-diethylbenzylamine hydrochloride, tribenzylamine hydrochloride, N-methyldibenzylamine hydrochloride, N,N-dimethylcyclohexylamine hydrochloride, N,N-diethylcyclohexylamine hydrochloride, N,N-dimethylbutylamine hydrochloride, N-methyldicyclohexylamine hydrochloride, N-ethyldicyclohexylamine hydrochloride, N-methylmorpholine hydrochloride, N-isopropylmorpholine hydrochloride, pyridine hydrochloride, quinoline hydrochloride, N,N-dimethylaniline hydrochloride, N,N-diethylaniline hydrochloride, N,N-dipropylaniline hydrochloride, N,N-dibutylaniline hydrochloride, N,N-dipentylaniline hydrochloride, N,N-dihexylaniline hydrochloride, N,N-dicyclohexylaniline hydrochloride, N,N-dibenzylaniline hydrochloride, triphenylamine hydrochloride, α-, β- or γ-picoline hydrochloride, 2,2'-bipyridyl hydrochloride, 1,4-dimethylpiperazine hydrochloride, tetramethylethylenediamine hydrochloride, hexamethylenetetramine hydrochloride, 1,8-diazabicyclo-[5.4.0]-7-undecene hydrochloride and the like, but are not limited to only these exemplified compounds.

Of these exemplified compounds, triethylamine hydrochloride, tri-n-propylamine hydrochloride, triisopropylamine hydrochloride, tri-n-butylamine hydrochloride, triisobutylamine hydrochloride, N,N-diisopropylethylamine hydrochloride, triethanolamine hydrochloride, N,N-dimethylcyclohexylamine hydrochloride, N,N-diethylcyclohexylamine hydrochloride, N,N-dimethylbutylamine hydrochloride, N-methyldicyclohexylamine hydrochloride, N-ethyldicyclohexylamine hydrochloride and 1,8-diazabicyclo-[5.4.0]-7-undecene hydrochloride are preferable. Triethylamine hydrochloride, tri-n-butylamine hydrochloride, triisobutylamine hydrochloride, N,N-dimethylcyclohexylamine hydrochloride and N-methyldicyclohexylamine hydrochloride are more preferable. These amine hydrochlorides can be used singly or in combination of two or more kinds thereof.

Some amine hydrochlorides are available compounds in reagents or industrial products, but unavailable compounds can be obtained by reacting equimolar amounts of amine and hydrochloric acid by known synthesis techniques. For example, the compounds are synthesized by adding hydrochloric acid by drops to amine or adding amine by drops to hydrochloric acid, in the presence or absence of a solvent. The compounds are isolated from a reaction solution containing these amine hydrochlorides by known purification methods such as solvent distillation, crystallization, column chromatography, sublimation, distillation or the like. If needed, recrystallization, sludging, rinsing or the like may be carried out.

The amount of amine hydrochloride to be used is in a range of 0.01 to 1.0 parts by weight, preferably in a range of 0.05 to 0.5, more preferably in a range of 0.05 to 0.3, based on total 100 parts by weight of one or more kind(s) of isocyanates selected from a polyisocyanate compound, a polyisothiocyanate compound and a polyisothiocyanate compound having an isocynato group and one or more kind(s) of a thiols selected from a polythiol compound. The amount of amine hydrochloride to be used is properly determined by the kind of a catalyst, a used monomer, the kind and the amount of an additive, and the shape of a molded material.

The same effect can be also obtained by using hydrohalide other than hydrochloride. There are, for example, bromine, iodine and the like for halogen. However, compared with the case of using other hydrohalides, the transparent resin has excellent properties of transparency and color in the case of using hydrochloride.

The method of adding of a catalyst to monomers may include a method of adding amine hydrochloride to isocyanates, thiols, or a resin modifier such as an alcohol compound or the like; a method of adding amine hydrochloride to a mixture of isocyanates and thiols or a mixture of isocyanates and a resin modifier such as an alcohol compound or the like; a method of adding amine hydrochloride to a mixture of isocyanates, thiols, a resin modifier such as an alcohol compound or the like; and the like. However, since the adjusting procedure differs depending on the kind and the used amount of monomers, a catalyst, a resin modifier and other additives to be used, it is not limited categorically. The method of adding a catalyst is properly chosen in consideration of solubility, handleability, safety, convenience and the like of the catalyst.

The polythiourethane resin of the present invention is comprised of one or more kind(s) of isocyanates selected from a polyisocyanate compound, a polyisothiocyanate compound and a polyisothiocyanate compound having an isocyanato group, and one or more kind(s) of thiols selected from a polythiol compound as the main component. For the purpose of adjusting optical properties, various physical properties such as impact resistance and specific gravity, and handleability of the monomer of the obtained resin, a resin modifier can be added.

Examples of the polyisocyanate compound in the present invention may include aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate and bis(isocyanatoethyl)ether;

alicyclic polyisocyanate compounds such as isophorone diisocyanate, 1,2-bis(isocyanatomethyl)cyclohexane, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyl dimethylmethane diisocyanate, di(2-methylcyclohexyl)methane-4,4'-diisocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane and 4,9-bis(isocyanatomethyl)tricyclodecane;

aromatic polyisocyanate compounds such as o-xylylene diisocyanate, m-xylylene diisocyanate, p-xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-diphenylmethane diisocyanate, di(3-methyldiphenyl)methane-4,4'-diisocyanate, bibenzyl-4,4'-diisocyanate, bis(isocyanatophenyl)ethylene, 3,3'-dimethoxybiphenyl-4,4'-diisocyanate, hexahydrobenzene diisocyanate and hexahydrodiphenylmethane-4,4-diisocyanate;

sulfur-containing aliphatic polyisocyanate compounds such as bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane and 1,5-diisocyanato-2-isocyanatomethyl-3-thiapentane;

sulfur-containing aromatic polyisocyanate compounds such as diphenyl sulfide-2,4-diisocyanate, diphenyl sulfide-4,4'-diisocyanate, 3,3'-dimethoxy-4,4'-diisocyanatodibenzyl thioether, bis(4-isocyanatomethylbenzene)sulfide, 4,4'-methoxybenzene thioethylene glycol-3,3'-diisocyanate, diphenyl disulfide-4,4'-diisocyanate, 2,2'-dimethyl diphenyl disulfide-5,5'-diisocyanate, 3,3'-dimethyl diphenyl disulfide-5,5'-diisocyanate, 3,3'-dimethyl diphenyl disulfide-6,6'-diisocyanate, 4,4'-dimethyl diphenyl disulfide-5,5'-diisocyanate, 3,3'-dimethoxy diphenyl disulfide-4,4'-diisocyanate and 4,4'-dimethoxy diphenyl disulfide-3,3'-diisocyanate;

sulfur-containing heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane and 4,5-bis(isocyanatomethyl)-2-methyl-1,3-dithiolane; and the like, but not limited to only these exemplified compounds. There may be used a halogen substitution products such as a chlorine substitution product or a bromine substitution product, an alkyl substitution product, an alkoxy substitution product, a nitro substitution product, prepolymer-modified products with polyhydric alcohol, carbodiimide-modified products, urea-modified products, burette-modified products, or dimerization or trimerization reaction products, of those compounds. These polyisocyanate compounds may be used singly, or in combination of two or more kinds thereof.

Examples of the polyisothiocyanate compound according to the present invention may include aliphatic polyisothiocyanate compounds such as hexamethylene diisothiocyanate, 2,2'-dimethylpentane diisothiocyanate, 2,2,4-trimethylhexane diisothiocyanate, butene diisothiocyanate, 1,3-butadiene-1,4-diisothiocyanate, 2,4,4-trimethylhexamethylene diisothiocyanate, 1,6,11-undecane triisothiocyanate, 1,3,6-hexamethylene triisothiocyanate, 1,8-diisothiocyanate-4-isothiocyanate methyloctane, bis(isothiocyanatoethyl)carbonate and bis(isothiocyanatoethyl)ether;

alicyclic polyisothiocyanate compounds such as isophorone diisothiocyanate, 1,2-bis(isothiocyanatomethyl)cyclohexane, 1,3-bis(isothiocyanatomethyl)cyclohexane, 1,4-bis(isothiocyanatomethyl)cyclohexane, dicyclohexylmethane diisothiocyanate, cyclohexane diisothiocyanate, methylcyclohexane diisothiocyanate, dicyclohexyl dimethylmethane isothiocyanate, 2,2'-dimethyldicyclohexylmethane isothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane and 4,9-bis(isothiocyanatomethyl)tricyclodecane;

aromatic polyisothiocyanate compounds such as o-xylylene diisothiocyanate, m-xylylene diisothiocyanate, p-xylylene diisothiocyanate, bis(isothiocyanatoethyl)benzene, bis(isothiocyanatopropyl)benzene, α,α,α',α'-tetramethylxylylene diisothiocyanate, bis(isothiocyanatobutyl)benzene, bis(isothiocyanatomethyl)naphthalene, bis(isothiocyanatomethyl)diphenyl ether, phenylene diisothiocyanate, tolylene diisothiocyanate, ethylphenylene diisothiocyanate, isopropylphenylene diisothiocyanate, dimethylphenylene diisothiocyanate, diethylphenylene diisothiocyanate, diisopropylphenylene diisothiocyanate, trimethylbenzene triisothiocyanate, benzene triisothiocyanate, biphenyl diisothiocyanate, toluidine diisothiocyanate, 4,4'-diphenylmethane diisothiocyanate, 3,3'-dimethyldiphenylmethane-4,4'-diisothiocyanate, bibenzyl-4,4'-diisothiocyanate, bis(isothiocyanatophenyl)ethylene, 3,3'-dimethoxybiphenyl-4,4'-diisothiocyanate, phenyl isothiocyanatoethyl isocyanate, hexahydrobenzene diisothiocyanate and hexahydrodiphenylmethane-4,4'-diisothiocyanate;

sulfur-containing aliphatic polyisothiocyanate compounds such as bis(isothiocyanatoethyl) sulfide, bis(isothiocyanatopropyl) sulfide, bis(isothiocyanatohexyl) sulfide, bis(isothiocyanatomethyl) sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane and 1,5-diisothiocyanato-2-isothiocyanatomethyl-3-thiapentane;

sulfur-containing aromatic polyisothiocyanate compounds such as diphenyl sulfide-2,4-diisothiocyanate, diphenyl sulfide-4,4'-diisothiocyanate, 3,3'-dimethoxy-4,4'-diisothiocyanatodibenzyl thioether, bis(4-isothiocyanatomethylbenzene) sulfide, 4,4'-methoxybenzene thioethylene glycol-3,3'-diisothiocyanate, diphenyl disulfide-4,4'-diisothiocyanate, 2,2'-dimethyl diphenyl disulfide-5,5-diisothiocyanate, 3,3'-dimethyl diphenyl disulfide-5,5-diisothiocyanate, 3,3'-dimethyl diphenyl disulfide-6,6-diisothiocyanate, 4,4'-dimethyl diphenyl disulfide-5,5-diisothiocyanate, 3,3'-dimethoxy diphenyl disulfide-4,4'-diisothiocyanate and 4,4'-dimethoxy diphenyl disulfide-3,3'-diisothiocyanate;

sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane and 4,5-bis(isothiocyanatomethyl)-2-methyl-1,3-dithiolane; and the like, but not limited to only these exemplified compounds. There may be used a halogen substitution products such as a chlorine substitution product or a bromine substitution product, an alkyl substitution product, an alkoxy substitution product, a nitro substitution product, prepolymer-modified products with polyhydric alcohol, carbodiimide-modified products, urea-modified products, burette-modified products, or dimerization or trimerization reaction products, of those compounds. These polyisothiocyanate compounds may be used singly, or in combination of two or more kinds thereof.

Among these exemplified compounds, m-xylylene diisocyanate, 2,5-bis(isocyanatomethyl)-bicyclo-[2.2.1]-heptane, 2,6-bis(isocyanatomethyl)-bicyclo-[2.2.1]-heptane, 1,3-bis(isocyanatomethyl)cyclohexane, 1,4-bis(isocyanatomethyl)cyclohexane and hexamethylene diisocyanate are preferred.

Examples of the polythiol compound related to the present invention may include aliphatic polythiol compounds such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropyl methyl ether, 2,3-dimercaptopropyl methyl ether, 2,2-bis(mercaptomethyl)-1,3-propanedithiol, bis(2-mercaptoethyl)ether and tetrakis(mercaptomethyl)methane;

aliphatic polythiol compounds containing an ester bond such as 2,3-dimercaptosuccinic acid(2-mercaptoethyl ester), thiomalic acid bis(2-mercaptoethyl ester), 2,3-dimercapto-1-propanol(2-mercaptoacetate), 2,3-dimercapto-1-propanol(3-mercaptopropionate), 3-mercapto-1,2-propanedioldi(2-mercaptoacetate), 3-mercapto-1,2-propanedioldi(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerin tris(2-mercaptoacetate), glycerin tris(3-mercaptopropionate), 1,4-cyclohexanediol bis(2-mercaptoacetate) and 1,4-cyclohexanediol bis(3-mercaptopropionate);

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachlor-1,5-bis(mercaptomethyl)benzene;

heterocyclic polythiol compounds such as 2-methylamino-4,6-dithiol sym-triazine, 2-ethylamino-4,6-dithiol sym-triazine, 2-amino-4,6-dithiol sym-triazine, 2-morpholino-4,6-dithiol sym-triazine, 2-cyclohexylamino-4,6-dithiol sym-triazine, 2-methoxy-4,6-dithiol sym-triazine, 2-phenoxy-4,6-dithiol sym-triazine, 2-thiobenzeneoxy-4,6-dithiol sym-triazine and 2-thiobutyloxy-4,6-dithiol sym-triazine, and halogen-substituted compounds thereof; and the like, but not limited to only these exemplified compounds. There may be used a halogen substitution products such as a chlorine substitution product or a bromine substitution product. These polythiol compounds may be used singly, or in combination of two or more kinds thereof.

Examples of the polythiol compound having one or more sulfide bond(s) in a molecule may include aliphatic polythiol compounds such as bis(mercaptomethyl) sulfide, bis(mercaptomethyl)disulfide, bis(mercaptoethyl) sulfide, bis(mercaptoethyl)disulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane and 2,5-dimercaptomethyl-2,5-dimethyl-1,4-dithiane;

aliphatic polythiol having an ester bond such as esters of these thioglycolic acids and mercaptopropionic acids, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3- mercaptopropionate), 1,4-dithiane-2,5-diolbis(3-mercaptopropionate), thiodiglycolic acid bis(2-mercaptoethy ester), thiodipropionic acid bis(2-mercaptoethyl ester), 4,4'-thiodibutanoic acid bis(2-mercaptoethyl ester), dithiodiglycolic acid bis(2-mercaptoethyl ester), dithiodipropionic acid bis(2-mercaptoethyl ester), 4,4'-dithiodibutylic acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), thiodipropionic acid bis(2,3-dimercaptopropyl ester) and dithiodipropionic acid bis(2,3-dimercaptopropyl ester);

heterocyclic polythiol compounds such as 3,4-thiophenedithiol and bismuthiol;

polythiol compounds having a dithioacetal or dithioketal skeleton such as 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,5-bis(4,4-bis(mercaptomethylthio)-2-thiabuthyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptodimethylthio)ethyl)-1,3-dithietane, 1,1,9,9-tetrakis(mercaptomethylthio)-5-(3,3-bis(mercaptomethylthio)-1-thiapropyl)3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabuthyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercapto methylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]-7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentylthio}-1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,11-dimercapto-2,4,6,10-tetrathiaundecane, 9-[2-(1,3-dithietanyl)methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio-5-mercaptomethylthio-1,3-dithiolane, 4-[3-bis(mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithietane, 2-[3,4-bis(mercaptomethylthio)-6-mercapto-2,5-dithiahexylthio]mercaptomethylthiomethyl-1,3-dithietane, 2-[3,4,8,9-tetrakis(mercaptomethylthio)-11-mercapto-2,5,7,10-tetrathiaundecylthio]mercaptomethylthiomethyl-1,3-dithietane, 2-[3-bis(mercaptomethylthio)methyl-5,6-bis(mercaptomethylthio)-8-mercapto-2,4,7-trithiaoctyl]mercaptomethylthiomethyl-1,3-dithietane, 4,5-bis{1-[2-(1,3-dithietanyl)]-3-mercapto-2-thiapropylthio}-1,3-dithiolane, 4-{1-[2-(1,3-dithietanyl)]-3-mercapto-2-thiapropylthio}-5-[1,2-bis(mercaptomethylthio)-4-mercapto-3-thiabutylthio]-1,3-dithiolane, 2-{bis[4-(5-mercaptomethylthio-1,3-dithiolanyl)thio]methyl}-1,3-dithietane, 4-[4-(5-mercaptomethylthio-1,3-dithiolanyl)thio]-5-{1-[2-(1,3-dithietanyl)]-3-mercapto-2-thiapropylthio}-1,3-dithiolane and oligomers thereof;

polythiol compounds having an orthotrithioformate skeleton such as tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl]-(mercaptomethyl thio)methane, tris[4,4'bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-trithiacyclohexane, tetrakis[3,3-bis(mercaptomethylthio)-2-thiapropyl]methane and oligomers thereof; and the like, but not limited to only these exemplified compounds. There may be used a halogen substitution products such as a chlorine substitution product or a bromine substitution product. These polythiol compounds having a sulfide bond may be used singly or in combination of two or more kinds thereof.

Examples of the thiol compound having a hydroxyl group may include 2-mercaptoethanol, 3-mercaptopropanol, 4-mercaptobutanol, 5-mercaptopentanol, 6-mercaptohexanol, 7-mercaptoheptanol, 8-mercaptooctanol, 5-mercapto-3-thiapentanol and the like, but are not limited to only these exemplified compounds. The thiol compounds having these hydroxyl groups may be used singly or in combination of two or more kinds thereof.

Among these exemplified compounds, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptodimethylthio)ethyl)-1,3-dithietane are preferred.

The resin modifier related to the present invention may include olefin compounds such as an alcohol compound, an amine compound, an epoxy resin, an organic acid and an anhydride thereof, and a (meth)acrylate compound.

The alcohol compound which can be added as a resin modifier may include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol and oligomers thereof, but is not limited to only these exemplified compounds. These alcohol compounds may be used singly or in combination of two or more kinds thereof.

The amine compound which can be added as a resin modifier may include monofunctional primary amine compounds such as ethylamine, n-propylamine, isopropylamine, n-butylamine, sec-butylamine, tert-butylamine, pentylamine, hexylamine, heptylamine, octylamine, decylamine, laurylamine, myristylamine, 3-pentylamine, 2-ethylhexylamine, 1,2-dimethylhexylamine, allylamine, aminomethylbicycloheptane, cyclopentylamine, cyclohexylamine, 2,3-dimethylcyclohexylamine, aminomethylcyclohexane, aniline, benzylamine, phenethylamine, 2,3- or 4-methylbenzylamine, o-, m- or p-methylaniline, o-, m- or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine and 2,2-diethoxyethylamine;

primary polyamine compounds such as ethylenediamine, 1,2- or 1,3-diaminopropane 1,2-, 1,3- or 1,4-diaminobutane, 1,5-diaminopentane, 1,6-diaminohexane, 1,7-diaminoheptane, 1,8-diaminooctane, 1,10-diaminodecane, 1,2-, 1,3- or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenylmethane, 4,4'-diaminodiphenyl sulfide, 3,3'- or 4,4'-diaminodiphenyl sulfone, 2,7-diaminofluorene, 1,5- 1,8- or 2,3-diaminonaphthalene, 2,3-, 2,6- or 3,4-diaminopyridine, 2,4- or 2,6-diaminotoluene, m- or p-xylylenediamine, isophoronediamine, diaminomethylbicycloheptane, 1,3- or 1,4-diaminomethylcycohexane, 2- or 4-aminopiperidine, 2- or 4-aminomethylpiperidine, 2- or 4-aminoethylpiperidine, N-aminoethylmorpholine and N-aminopropylmorpholine;

monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine and morpholine;

secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine; and the like, but is not limited to only these exemplified compounds. These amine compounds may be used singly or in combination of two or more kinds thereof.

The epoxy resins which can be added as a resin modifier may include phenolic epoxy compounds obtained by condensation reaction of a polyphenol compound such as bisphenol A glycidyl ether with an epihalohydrin compound; alcoholic epoxy compounds obtained by condensation of a polyhydric alcohol compound such as hydrogenated bisphenol A glycidyl ether with an epihalohydrin compound; glycidyl ester-based epoxy compounds obtained by condensation of a polyhydric organic acid compound such as 3,4-epoxycyclohexylmethyl-3',4'-epoxycyclohexane carboxylate and 1,2-hexahydrophthalic diglycidyl ester with an epihalohydrin compound; amine-based epoxy compounds obtained by condensation of a primary and secondary diamine compound with an epihalohydrin compound; aliphatic polyvalent epoxy compounds such as vinyl cyclohexene diepoxide; and the like, but are not limited to only these exemplified compounds. These epoxy resins may be used singly or in combination of two or more kinds thereof.

The organic acids and anhydrides thereof which can be added as a resin modifier may include thiodiglycolic acid, thiodipropionic acid, dithiodipropionic acid, phthalic anhydride, hexahydrophthalic anhydride, methylhexahydrophthalic anhydride, methyltetrahydrophthalic anhydride, methyl norbornene acid anhydride, methyl norbornane anhydride, maleic acid anhydride, trimellitic anhydride, pyromellitic anhydride and the like, but are not limited to only these exemplified compounds. These organic acids and anhydrides thereof may be used singly or in combination of two or more kinds thereof.

The olefin compounds which can be added as a resin modifier may include (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acloxyethoxyphenyl)propane, 2,2-bis(4-methacloxyethoxyphenyl)propane, 2,2-bis(4-acloxydiethoxyphenyl) propane, 2,2-bis(4-methacloxydiethoxyphenyl)propane, bisphenol F diacrylate, bisphenol F dimethacrylate, 1,1-bis (4-acloxyethoxyphenyl)methane, 1,1-bis(4-methacloxyethoxyphenyl)methane, 1,1-bis(4-acloxydiethoxyphenyl)

methane, 1,1-bis(4-methacloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetracrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethyl sulfide diacrylate and mercaptoethyl sulfide dimethacrylate;

allyl compounds such as allyl glycidyl ether, diallyl phthalate, diallyl terephthalate, diallyl isophthalate, diallyl carbonate and diethylene glycol bisallyl carbonate;

vinyl compounds such as styrene, chlorostyrene, methylstyrene, bromostyrene, dibromostyrene, divinylbenzene and 3,9-divinylspirobi(m-dioxane); and the like, but are not limited to only these exemplified compounds. These olefin compounds may be used singly or in combination of two or more kinds thereof.

In the present invention, for a proportion of the isocyanates and the thiols to be used as starting materials, and the alcohol compound as a resin modifier, the functional molar ratio of (NCO+NCS)/(SH+OH) is in the range of usually from 0.5 to 3.0, preferably from 0.6 to 2.0, more preferably from 0.8 to 1.2.

The preparation of a polymerizable composition by mixing the isocyanates, the thiols, the catalyst and other additives is usually carried out at a temperature of 25° C. or lower. From the viewpoint of pot life of the composition, the temperature is preferred to be further lower in some cases. However, in the case where the catalyst or the additives are less soluble in monomers, they can be dissolved in a monomer mixture or the isocyanates or the thiols which are monomers by warming in advance.

The method for producing a polythiourethane resin of the present invention may include cast polymerization. That is, the polymerizable composition related to the present invention is injected in a mold which is holded with a gasket or a tape or the like. At this time, depending on the desired properties of the obtained plastic lens, if needed, it is often preferable to carry out a degassing treatment under reduced pressure or a filtration under pressure or reduced pressure. The polymerization condition is not limited since it differs greatly depending on a polymerizable composition, the kind and the used amount of a catalyst, the shape of a mold or the like. However, the polymerization is carried out at a temperature of −50 to 150° C. for 1 to 50 hour(s). It is preferable to keep or gradually raise the temperature in a range of 10 to 150° C. and cure for 1 to 25 hour(s) in some cases.

For the obtained polythiourethane resin, if needed, treatments such as annealing may be carried out. The treatment is normally carried out at a temperature of 50 to 150° C., preferably 90 to 140° C., more preferably 100 to 130° C.

Upon molding the polythiourethane resin of the present invention, various additives such as an internal mold release agent, a chain extender, a crosslinking agent, a photostabilizer, a UV absorber, an antioxidant, a discoloration-preventing agent, an oil soluble dye, a filler and an adhesiveness-improving agent may be added, depending on the purposes as in a known molding method.

The polythiourethane resin of the present invention can be obtained as molded products in various shapes by changing the mold upon cast polymerization, and can be used for various purposes as a resin for optical use such as a spectacle lens, a camera lens and a light-emitting diode (LED). In particular, it is suitable as an optical material for a spectacle lens, a camera lens and a light-emitting diode, and an optical element.

A plastic lens of the present invention in which the polythiourethane resin is used may be, if needed, provided a coating layer on one side or both sides. The coating layer may include a primer layer, a hard coating layer, an antireflective layer, an antifogging coating layer, an antifouling layer and a water repellent layer. These coating layers may be used singly or in multilayer of a plurality of the coating layers. In the case where a coating layer is provided on both sides of the lens, the same coating layer or different coating layer can be provided on each side.

In each coating layer, a UV absorber for the purpose of shielding the lens or the eye from ultraviolet rays, an IR absorber for the purpose of shielding the eye from infrared rays, a stabilizer or an antioxidant for the purpose of improving the weather resistance of the lens, a dye or a pigment for the purpose of enhancing the fashionability of the lens, in addition, a photochromic dye or a photochromic pigment, or an antistatic agent, and other known additives for enhancement of the properties of the lens can be used together. With regard to the coating layer by applying, various leveling agents for improving the coating properties can be contained.

The primer layer is generally formed between the hard coating layer and the optical lens which will be described later. The primer layer is a coating layer provided for the purpose of improving adhesiveness between the hard coating layer formed above the primer layer and the lens, and the impact resistance can be improved according to the circumstances.

Any material can be used for the primer layer as long as it has high adhesion to the obtained optical lens. Generally, a primer composition which contains primarily of a urethane-based resin, an epoxy-based resin, a polyester-based resin, a melanin-based resin and polyvinyl acetal or the like is used. For the primer composition, a proper solvent having no influence on the lens may be used for the purpose of adjusting viscosity of the composition. Needless to say, the composition can be used without a solvent.

The primer composition can be used by any of a coating method and a dry method. In the case of employing the coating method, a primer layer is formed by performing coating according to a known method such as spin coating or dip coating on lens, followed by solidification. In the case of employing the dry method, the primer layer is formed by a known dry method such as a chemical vapor deposition (CVD) method or a vacuum deposition method. When forming the primer layer, the surface of the lens may be subjected to a pretreatment such as alkaline treatment, plasma treatment and ultraviolet treatment for the purpose of improving adhesion, if needed.

The hard coating layer is a coating layer aimed to provide functions such as scratch resistance, wear resistance, moisture resistance, hot water resistance, heat resistance and weather resistance to the surface of the lens.

For the hard coating layer, a hard coating composition which includes a curable organosilicon compound, one or more kinds of oxide fine particles of the element selected from the element group consisting of Si, Al, Sn, Sb, Ta, Ce, La, Fe, Zn, W, Zr, In and Ti and/or one or more kinds of fine particles composed of two or more kinds of composite oxide selected from the group of these elements are normally used.

The hard coating composition is preferred to include at least any one of amines, amino acids, metal acetylacetonate complex, a metal salt of an organic acid, perchloric acids, a salt of perchloric acids, acids, metal chloride and a polyfunctional epoxy compound except for above-mentioned compound. A proper solvent which do not affect on the lens can be used for the hard coating composition. Needless to say, it may be used without a solvent.

The hard coating layer is usually formed by curing after applying the hard coating composition by a known coating method such as spin coating and dip coating. Examples of the curing method may include thermal curing, curing by irradiation with an energy ray such as ultraviolet and visible light, and the like. In order to suppress the generation of interference patterns, a refractive index of the hard coating layer preferably has a difference in the refractive index of in a range of ±0.1 from the lens.

The antireflective layer is normally formed on the above-mentioned hard coating layer, if needed. As the antireflective layer, the layer containing an inorganic compound and an organic compound is used. In the case of the inorganic system or the layer is formed by a dry method such as a vacuum deposition method, a sputtering method, an ion plating method, an ion beam assist method and a CVD method using an inorganic oxide such as $SiO_2$ and $TiO_2$. In the case of the organic system, the layer is formed by a wet method using a composition including an organosilicon compound and silica-based fine particles having an inner cavity.

The antireflective layer has a single layer and a multilayer. In the case of using the single layer, a refractive index of the antireflective layer is preferably at least 0.1 or lower than that of the hard coating layer. A multilayer antireflective layer is preferred to fulfill antireflective function effectively, in that case, a coating layer of low refractive index and a coating layer of high refractive index coating is alternately laminated. The difference of the refractive index between the low refractive index coating and the high refractive index coating is also preferably 0.1 or more. Examples of the high refractive index coating may include coatings such as $ZnO$, $TiO_2$, $CeO_2$, $Sb_2O_5$, $SnO_2$, $ZrO_2$ and $Ta_2O_5$, and examples of the low refractive index coating layer may include an $SiO_2$ coating and the like.

An antifogging coating layer, an antifouling layer and a water repellent layer can be formed on the antireflective layer if needed. As the method for forming the antifogging coating layer, the antifouling layer and the water repellent layer, a known antifogging coating treatment method, antifouling treatment method, water repellent treatment method and materials can be used without limiting the treatment method, treatment materials or the like as long as they do not adversely affect the antireflective function. Examples of the antifogging coating treatment method and antifouling treatment method may include a method of coating the surface with a surfactant, a method of imparting water absorbability by applying a hydrophilic coating on the surface, a method of enhancing the water absorbability by covering the surface with fine unevenness, a method of imparting water absorbability by utilizing photocatalytic activity, a method of preventing water droplets from adhering by being subjected to a super water-repellent treatment and the like. In addition, the water repellent treatment method may include a method of forming a water repellent-treated layer by depositing or sputtering a fluorine-containing silane compound or the like, a method of coating to form a water repellent-treated layer after dissolving a fluorine-containing silane compound in a solvent, and the like.

The plastic lens using the polythiourethane resin of the present invention may be dyed with the use of a pigment for purposes such as impartation of fashionability, a photochromic property or the like.

Dyeing the lens can be performed by a known dyeing method. The following method is normally performed:

(1) a method of immersing a lens in a dyeing liquid;
(2) a method of coating using a coating agent containing a pigment, or a method of preparing a dyeable coating layer to dye the coating layer;
(3) a method of containing a dyeable material in starting monomers to polymerize; and
(4) a method of sublimating a sublimable pigment by heating.

The method (1) is to immerse a lens material finished as a predetermined optical surface in a dyeing liquid in which a pigment to be used is dissolved or uniformly dispersed (dyeing process), thereafter, if needed, to immobilize the pigment by heating the lens (post-dyeing annealing process). The pigment to be used in the dyeing process is not particularly limited as long as it is a known pigment. Normally, oil soluble dyes or disperse dyes are used. The solvent to be used in the dyeing process is not particularly limited as long as the pigment to be used is dissolvable or uniformly dispersible. In this dyeing process, a surfactant for dispersing the pigment in the dyeing liquid or a carrier for promoting dyeing can be added if needed. In the dyeing process, the pigment and the surfactant which are added as needed are dispersed in water or a mixture of water and an organic solvent to prepare a dye bath, an optical lens is immersed in this dye bath, and dyed at a predetermined temperature for a predetermined time. The dyeing temperature and time varies depending on a desired color concentration. Normally, at 120° C. or lower for several minutes to several tens of hours, and the dye concentration of the dye bath is 0.01 to 10% by weight. In the case where it is difficult to dye, it may be carried out under pressure. The post-dyeing annealing process as needed is to heat the lens material which is dyed in the dyeing process. The heating treatment is carried out in predetermined time in a furnace such as an infrared heating furnace or a resistance heating furnace in an air atmosphere after water remaining on the surface of the dyed lens material is removed by a solvent or the like, or the solvent remaining on the lens material is dried in the air. The post-dyeing annealing process prevents the dyed lens material from decoloring (decoloring preventive treatment) as well as water which is penetrated inside of the lens material when dyeing is removed.

The method (2) is not a way of directly dyeing the plastic lens material. The method employs a method of forming a dyed coating layer on the surface of a lens by applying an organic coating solution in which a pigment is dispersed or dissolved to a plastic lens followed by curing, or a method of dyeing by forming on the surface of a plastic lens a dyeable coating layer and then employing the method (1), specifically immersing a plastic lens in a dye liquid followed by heating to dye the lens.

The method (3) is a method of polymerizing after dissolving a dye in starting monomers of the plastic lens in advance. The pigment to be used is not particularly limited as long as it is uniformly dissolved or dispersible in the starting monomers to a degree not impairing optical properties.

The method (4) has (a) a method of dyeing a plastic lens by sublimating a solid sublimable pigment; (b) a method of dyeing by facing a base in which a solution including a sublimable pigment is applied, to a plastic lens out of touch, and heating the base and the lens; and (c) a method of dyeing by transferring a transferred layer constituted of a colored layer containing a sublimable pigment and an adhesive layer to a plastic lens and heating; and the optical lens of the present invention can be dyed by any of the above methods. The pigment to be used is not particularly limited as long as it has a sublimation property.

EXAMPLES

Hereinafter, the present invention will be further specifically illustrated with reference to Examples. The polymerization rate, transparency of resin and the performance testing of the lens (refractive index, Abbe number and heat resistance) were evaluated by the following test methods.

Polymerization rate: a polymerizable composition which includes isocyanates, thiols, catalysts and additives were hold at 20° C. for 7 hours, and then the viscosity (mPa·s) was measured by a B type viscometer. It was determined that higher the obtained viscosity is faster the polymerization rate.

Stability of resin quality: resinification was carried out using eight lots of the internal mold release agent which differs producing lots under given conditions, and it was decided that resin in which optical inhomogeneity and white turbidity were not observed in all lots represented as O (having a stability of resin quality) and resin in which optical inhomogeneity and white turbidity were observed in at least one lot (having no stability of resin quality) represented as X.

Polymerization lag: polymerization lag means the difference of the polymerization rate among the lots. After carrying out resinification using eight lots of the above-mentioned internal mold release agent, the polymerization lag was measured from each polymerization rate. More specifically, the difference between the minimum value and the maximum value in the eight lots was used as a lag width. When this lag width is more than 50 mPa·s, in the case of resinifying under given conditions, optical inhomogeneity and white turbidity may be generated in the obtained resin, or resin which has stable quality may not be obtained.

Transparency of resin (check for white turbidity): check for white turbidity described above was determined as a transparency of resin as described below. The obtained resin was irradiated to a projector in the dark, and the presence of fogging and opaque substances in lenses was checked through the human eye. In the case of no fogging and no opaque substances in lenses, that is represented as O (absence of white turbidity). In the case of the present fogging and opaque substances in lenses, that is represented as X (presence of white turbidity).

Refractive index (ne) and Abbe number (υe): the refractive index and Abbe number were measured using a Pulfrich refractometer at 20° C.

Heat resistance: a glass transition temperature (Tg) (° C.) was set to be heat resistance in a TMA penetration method (a load of 50 g, a probe tip of 0.5 mmφ and a temperature rising rate of 10° C./min).

Example 1

36.4 g of m-xylylenediisocyanate, 33.6 g of 4-mercaptomethyl-1,8-dimercapto-3,6-dithiaoctane, 0.105 g of triethylamine hydrochloride (TEHC) (1500 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were a refractive index (ne) of 1.664, Abbe number (υe) of 31 and heat resistance (Tg) of 89° C. A polymerization rate of the above-mentioned polymerizable composition (a viscosity after holding at 20° C. for 7 hours) was measured using eight lots of the internal mold release agent in which the producing lots differed. The minimum value in the eight lots was 180 mPa·s, and the maximum value was 200 mPa·s. The lag width which was the difference between them was as small as 20 mPa·s, and confirmed to be less than 50 mPa·s. Resulting from resinification in all lots, it was confirmed that stable resin without optical inhomogeneity and white turbidity in each lot could be obtained. The results are shown in [Table 1].

Example 2

36.4 g of m-xylylenediisocyanate, 33.6 g of 4-mercaptomethyl-1,8-dimercapto-3,6-dithiaoctane, 0.105 g of N-methyldicyclohexylamine hydrochloride (MDCHC) (1500 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.664, Abbe number (υe) of 32 and heat resistance (Tg) of 88° C. A polymerization rate of the above-mentioned polymerizable composition (a viscosity after holding at 20° C. for 7 hours) was measured using eight lots of the internal mold release agent in which the producing lots differed. The minimum value in the eight lots was 180 mPa·s, and the maximum value was 200 mPa·s. The lag width which was the difference between them was as small as 20 mPa·s, and confirmed to be less than 50 mPa·s. Resulting from resinification in all lots, it was confirmed that quality-stable resin without optical inhomogeneity and white turbidity in each lot could be obtained. The results are shown in [Table 1].

Example 3

36.4 g of m-xylylenediisocyanate, 33.6 g of 4-mercaptomethyl-1,8-dimercapto-3,6-dithiaoctane, 0.14 g of triisobutylamine hydrochloride (TBHC) (2000 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.664, Abbe number (υe) of 31 and heat resistance (Tg) of 88° C. A polymerization rate of the above-mentioned polymerizable composition (a viscosity after holding at 20° C. for 7 hours) was measured using eight lots of the internal mold release agent in which the producing lots differed. The minimum value in the eight lots was 180 mPa·s, and the maximum value was 200 mPa·s. The lag width which was the difference between them was as small as 20 mPa·s, and confirmed to be less than 50 mPa·s. Resulting from resinification in all lots, it was confirmed that quality-stable resin without optical inhomogeneity and white turbidity in each lot could be obtained. The results are shown in [Table 1].

Example 4

35.4 g of a mixture of 2,5-bis(isocyanatomethyl)-bicyclo-[2.2.1]-heptane and 2,6-bis(isocyanatomethyl)-bicyclo-[2.2.1]-heptane, 17.9 g of 4-mercaptomethyl-1,8-dimercapto-3,6-dithiaoctane, 16.7 g of pentaerythritol tetrakis(3-mercaptopropionate), 0.14 g of N-methyldicyclohexylamine hydrochloride (MDCHC) (2000 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.598, Abbe number (υe) of 40 and heat resistance (Tg) of 110° C. A polymerization rate of the above-mentioned polymerizable composition (a viscosity after holding at 20° C. for 7 hours) was measured using eight lots of the internal mold release agent in which the producing lots differed. The minimum value in the eight lots was 60 mPa·s, and the maximum value was 70 mPa·s. The lag width which was the difference between them was as small as 10 mPa·s, and confirmed to be less than 50 mPa·s. Resulting from resinification in all lots, it was confirmed that quality-stable resin without optical inhomogeneity and white turbidity in each lot could be obtained. The results are shown in [Table 1].

Example 5

38.0 g of a mixture of 2,5-bis(isocyanatomethyl)-bicyclo-[2.2.1]-heptane and 2,6-bis(isocyanatomethyl)-bicyclo-[2.2.1]-heptane, 32.0 g of 4-mercaptomethyl-1,8-dimercapto-3,6-dithiaoctane, 0.14 g of N-methyldicyclohexylamine hydrochloride (MDCHC) (2000 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.623, Abbe number (υe) of 39 and heat resistance (Tg) of 118° C. A polymerization rate of the above-mentioned polymerizable composition (a viscosity after holding at 20° C. for 7 hours) was measured using eight lots of the internal mold release agent in which the producing lots differ. The minimum value in the eight lots was 60 mPa·s, and the maximum value was 70 mPa·s. The lag width which was the difference between them was as small as 10 mPa·s, and confirmed to be less than 50 mPa·s. Resulting from resinification in all lots, it was confirmed that quality-stable resin without optical inhomogeneity and white turbidity in each lot could be obtained. The results are shown in [Table 1].

Comparative Example 1

36.4 g of m-xylylenediisocyanate, 33.6 g of 4-mercaptomethyl-1,8-dimercapto-3,6-dithiaoctane, 0.0105 g of 1,8-diazabicyclo-(5,4,0)-7-undecene (DBU) (150 ppm based on the total weight of the polymerizable composition), 0.070 g of an internal mold release agent (STEPAN Co. Ltd., trade name Zelec UN) (1000 ppm based on the total weight of the polymerizable composition) and 0.035 g of an ultraviolet absorber (Kyodo Yakuhin Co. Ltd., trade name Viosorb 583) (500 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.665, Abbe number (υe) of 32 and heat resistance (Tg) of 89° C. A polymerization rate of the above-mentioned polymerizable composition (a viscosity after holding at 20° C. for 7 hours) was measured using eight lots of the internal mold release agent where the producing lots are different. The minimum value in the eight lots was 60 mPa·s, and the maximum value was 400 mPa·s. The lag width which was the difference between them was as large as 340 mPa·s, and confirmed to be 50 mPa·s or more. Resulting from resinification in all lots, it was confirmed that optical inhomogeneity and white turbidity were observed in some lots. The results are shown in [Table 1].

Comparative Example 2

36.4 g of m-xylylenediisocyanate, 33.6 g of 4-mercaptomethyl-1,8-dimercapto-3,6-dithiaoctane, 0.028 g of 1,8-diazabicyclo-(5,4,0)-7-undecene octylate (DBUOA) (400 ppm based on the total weight of the polymerizable composition), 0.070 g of an internal mold release agent (STEPAN Co. Ltd., trade name Zelec UN) (1000 ppm based on the total weight of the polymerizable composition) and 0.035 g of an ultraviolet absorber (Kyodo Yakuhin Co. Ltd., trade name Viosorb 583) (500 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.665, Abbe number (νe) of 32 and heat resistance (Tg) of 89° C. A polymerization rate of the above-mentioned polymerizable composition (a viscosity after holding at 20° C. for 7 hours) was measured using eight lots of the internal mold release agent in which the producing lots differed. The minimum value in the eight lots was 80 mPa·s, and the maximum value was 350 mPa·s. The lag width which was the difference between them was as large as 270 mPa·s, and confirmed to be 50 mPa·s or more. Resulting from resinification in all lots, it was confirmed that optical inhomogeneity and white turbidity were observed in some lots. The results are shown in [Table 1].

Comparative Example 3

36.4 g of m-xylylenediisocyanate, 33.6 g of 4-mercaptomethyl-1,8-dimercapto-3,6-dithiaoctane, 0.042 g of triphenylphosphine (TPP) (600 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.665, Abbe number (νe) of 32 and heat resistance (Tg) of 89° C. A polymerization rate of the above-mentioned polymerizable composition (a viscosity after holding at 20° C. for 7 hours) was measured using eight lots of the internal mold release agent in which the producing lots differed. The minimum value in the eight lots was 150 mPa·s, and the maximum value was 240 mPa·s. The lag width which with the difference between them was as large as 90 mPa·s, and confirmed to be 50 mPa·s or more. Resulting from resinification in all lots, it was confirmed that optical inhomogeneity and white turbidity were observed in some lots. The results are shown in [Table 1].

Comparative Example 4

36.4 g of m-xylylenediisocyanate, 33.6 g of 4-mercaptomethyl-1,8-dimercapto-3,6-dithiaoctane, 0.0042 g of dimethyltin dichloride (60 ppm based on the total weight of the polymerizable composition), 0.0042 g of N,N-dimethylcyclohexylamine (60 ppm based on the total weight of the polymerizable composition), 0.035 g of an ultraviolet absorber (Kyodo Yakuhin Co. Ltd., trade name Viosorb 583) (500 ppm based on the total weight of the polymerizable composition) and 0.070 g of an internal mold release agent (STEPAN Co. Ltd., trade name Zelec UN) (1000 ppm based on the total weight of the polymerizable composition) were mixed and dissolved at 20° C. to give a homogeneous solution. This mixed solution was degassed at 400 Pa for 1 hour. Thereafter, the solution was filtered through a 1 μm PTFE filter, and then injected into a mold composed of a pair of glass molds and tape. This mold was placed in a polymerization oven, and slowly heated from 25 to 120° C. to polymerize for 21 hours. After completing the polymerization, the mold was taken out from the oven. The releasability from the mold was good. The obtained resin was further subjected to annealing at 130° C. for 4 hours. The properties of the obtained resin were the refractive index (ne) of 1.665, Abbe number (νe) of 32 and heat resistance (Tg) of 89° C. A polymerization rate of the above-mentioned polymerizable composition (a viscosity after holding at 20° C. for 7 hours) was measured using eight lots of the internal mold release agent in which the producing lots differed. The minimum value in the eight lots was 160 mPa·s, and the maximum value was 370 mPa·s. The lag width which was the difference between them was as large as 210 mPa·s, and confirmed to be more than 50 mPa·s. Resulting from resinification in all lots, it was confirmed that optical inhomogeneity and white turbidity were observed in some lots. The results are shown in [Table 1].

TABLE 1

| Ex | Catalyst (ppm) | Internal Mold Release Agent (ppm) | Refractive Index (ne) | Abbe Number (νe) | Heat Resistance (° C.) | Polymerization Rate | | | Optical Inhomogeneity | White Turbidity (Transparency) | Stability of Resin Quality |
|---|---|---|---|---|---|---|---|---|---|---|---|
| | | | | | | Minimum Value (mPa·s) | Maximum Value (mPa·s) | Lag Width (mPa·s) | | | |
| Ex 1 | TEHC (1500) | 1000 | 1.664 | 31 | 89 | 180 | 200 | 20 | ○ | ○ | ○ |
| Ex 2 | MDCHC (1500) | 1000 | 1.664 | 32 | 88 | 180 | 200 | 20 | ○ | ○ | ○ |
| Ex 3 | TBHC (2000) | 1000 | 1.664 | 31 | 88 | 180 | 200 | 20 | ○ | ○ | ○ |
| Ex 4 | MDCHC (2000) | 1000 | 1.598 | 40 | 110 | 60 | 70 | 10 | ○ | ○ | ○ |
| Ex 5 | MDCHC (2000) | 1000 | 1.623 | 39 | 118 | 60 | 70 | 10 | ○ | ○ | ○ |

TABLE 1-continued

| Ex | Catalyst (ppm) | Internal Mold Release Agent (ppm) | Refractive Index (ne) | Abbe Number (ve) | Heat Resistance (° C.) | Polymerization Rate | | | Optical Inhomogeneity | White Turbidity (Transparency) | Stability of Resin Quality |
|---|---|---|---|---|---|---|---|---|---|---|---|
| | | | | | | Minimum Value (mPa·s) | Maximum Value (mPa·s) | Lag Width (mPa·s) | | | |
| Comp. Ex 1 | DBU (150) | 1000 | 1.665 | 32 | 89 | 60 | 400 | 340 | X | X | X |
| Comp. Ex 2 | DBUOA (400) | 1000 | 1.665 | 32 | 89 | 80 | 350 | 270 | X | X | X |
| Comp. Ex 3 | TPP (600) | 1000 | 1.665 | 32 | 89 | 150 | 240 | 90 | X | X | X |
| Comp. Ex 4 | Dimethyl tin Dichloride (60) | 1000 | 1.665 | 32 | 89 | 160 | 370 | 210 | X | X | X |

From the results described above, the polymerization catalyst of the present invention does not contain an organotin compound which has been conventionally used as a catalyst for a polythiourethane resin. In addition, by using the polymerization catalyst of the present invention, a polythiourethane resin, which is suitably used as a transparent resin for optical use, can be obtained without being affected by the acidity of an additive. In the case of using the polymerization catalyst according to the present invention, stable pot life whose lag width was small could be obtained. Therefore, stable quality of resin in which optical inhomogeneity and white turbidity were not generated in all lots was obtained. In Examples 1 to 3, resin whose polymerization rate is high and pot life is short is used. However, since the catalyst of the present invention is used, stable pot life could be secured and the polymerization rate was practicable for a method for producing resin. Meanwhile, in Comparative Examples, the lag width of the polymerization rate was large, and the obtained resin had poor quality stability. Thereby, the polymerization catalyst of the present invention is proper for securing stable pot life and producing a polythiourethane resin stably.

INDUSTRIAL APPLICABILITY

A polythiourethane resin which is suitably used as a transparent resin for optical use can be obtained with the polymerization catalyst of the present invention. Therefore, the present invention contributes to providing a suitable starting material in the field of spectacles lenses.

A polythiourethane resin which is obtained by the present invention is used for optical materials such as a plastic lens, a prism, an optical fiber, an information recording substrate, a filter, a light-emitting diode or the like, and particularly suitably for a plastic lens material for spectacles.

The invention claimed is:

1. A polymerization composition for polythiourethane optical material, comprising: a polymerization catalyst; isocyanate; and thiol,
    wherein said polymerization catalyst is at least one amine hydrochloride selected from the group consisting of triethylamine hydrochloride, triisobutylamine hydrochloride, and N-methyldicyclohexylamine hydrochloride,
    wherein the isocyanate is at least one compound selected from the group consisting of m-xylylenediisocyanate, 2,5-bis(isocyanatomethyl)-bicyclo-[2.2.1]-heptane, and 2,6-bis(isocyanatomethyl)-bicyclo-[2.2.1]-heptane,
    wherein the thiol is at least one compound selected from the group consisting of 4-mercaptomethyl-1,8-dimercapto-3,6-dithiaoctane, and pentaerythritol tetrakis(3-mercaptopropionate),
    wherein the amount of the amine hydrochloride is in a range of 0.05 to 0.3 parts by weight, based on total 100 parts by weight of the isocyanate and the thiol, and
    wherein said polymerization catalyst contained in said polymerization composition consists of said amine hydrochloride.

2. A polythiourethane resin obtained by curing the polymerization composition as claimed in claim 1.

3. An optical material comprising the polythiourethane resin as claimed in claim 2.

4. A plastic lens comprising the optical material as claimed in claim 3.

5. A method for producing a polythiourethane resin, comprising:
    obtaining a polythiourethane resin by cast-polymerizing the polymerization composition as claimed in claim 1.

* * * * *